(No Model.)
T. W. HEERMANS.
VALVE.
No. 464,687. Patented Dec. 8, 1891.
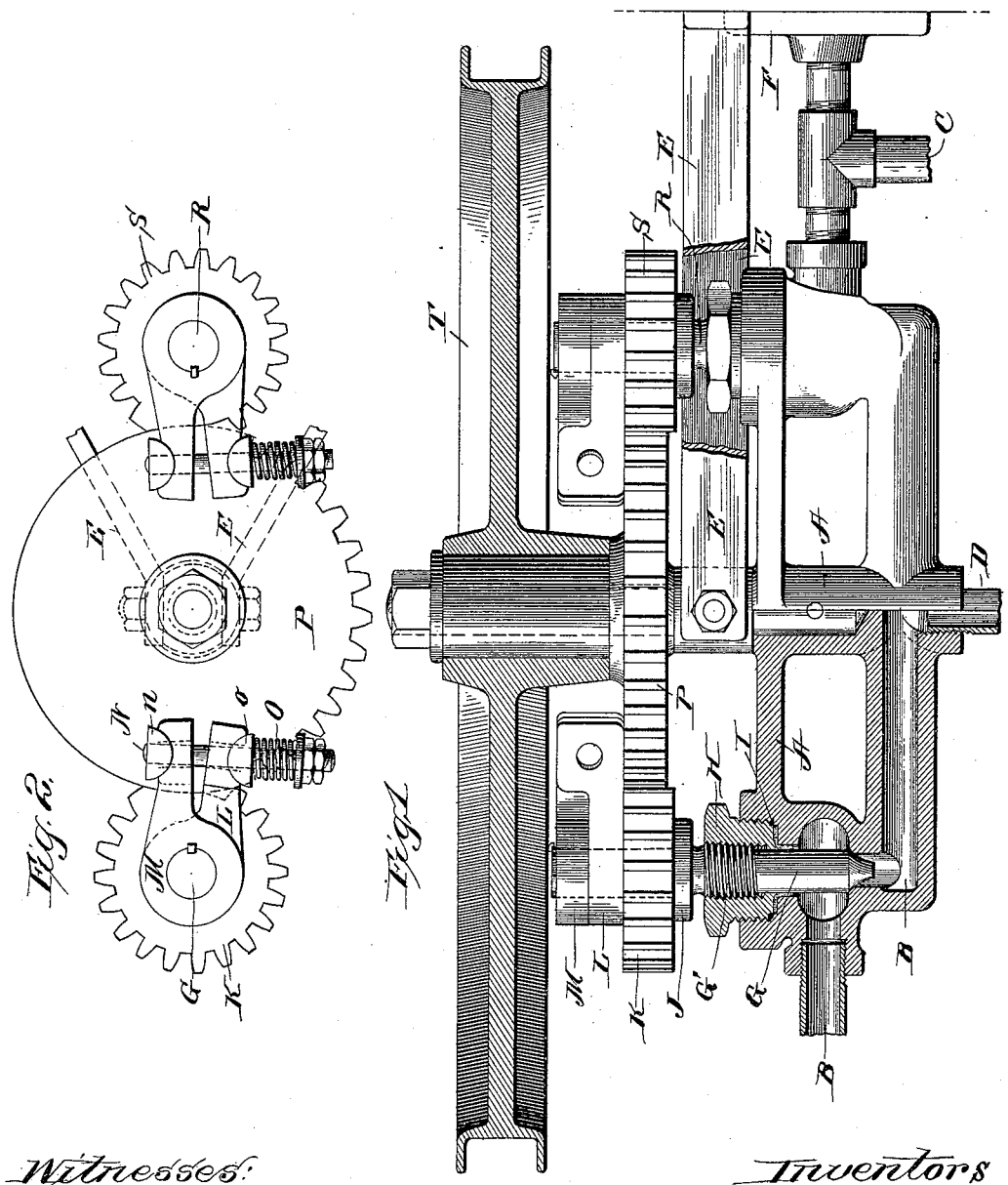
Witnesses:
Wm. M. Rheem
E. C. Wardeman
Inventors
T. W. Heermans
By Raymond & Veeder
Attys

UNITED STATES PATENT OFFICE.

THADDEUS W. HEERMANS, OF CHICAGO, ILLINOIS, ASSIGNOR, BY MESNE ASSIGNMENTS, TO THE NATIONAL COMPANY, OF ILLINOIS.

VALVE.

SPECIFICATION forming part of Letters Patent No. 464,687, dated December 8, 1891.

Application filed May 11, 1891. Serial No. 392,286. (No model.)

*To all whom it may concern:*

Be it known that I, THADDEUS W. HEERMANS, of Chicago, in the county of Cook and State of Illinois, have invented certain new and useful Improvements in Control-Valves, of which the following is a specification.

My invention relates to valves for controlling the inlet and outlet of water to and from the cylinder of a hydraulic elevator and for other similar purposes, and it is especially adapted for the control of high pressure. To this end I employ separate valves for the control of the inlet and outlet passages, respectively, so that in their movement they are independent each of the other, while at the same time they are so connected as to preclude the possibility of one valve being opened before the other is closed. Movement takes place in but one valve at a time, the opening and closure of each being effected only after the other valve has been closed. Thus it is practicable to employ simple direct-seated valves instead of piston or ported valves, such as are necessary when the ports for the inlet and outlet of the motor-fluid are controlled by simultaneously-operating valves.

In the accompanying drawings, Figure 1 is a side view, partly in section, of a valve embodying my invention. Fig. 2 is a plan view of the same, the sheave by which the operating-rope is connected to the valve being omitted.

A is the valve-case.

B is the inlet and C the outlet passage.

D is the passage leading to the elevator-cylinder.

The struts E E and the foot F serve to support the valve in position. The inlet-passage B is controlled by a valve G. The upper end of the valve-spindle G' is threaded and works in an internally-threaded bushing H. The bushing is threaded externally also and is screwed into a socket in the valve-casing, at the bottom of which is placed a cupped leather washer I, said cupped leather washer forming a water-tight joint with the plain cylindrical surface of the valve-spindle below the threaded portion. The outer end of the valve-spindle G' is provided with a collar J, upon which rests a pinion K, fitted to the valve-spindle, so as to turn freely thereon. Said pinion K has a lug L thereon, which projects above its upper surface and projects beyond the circumference of the pinion. An arm M is keyed or otherwise firmly secured to the spindle of the valve, and its outer end is offset, so as to come opposite the outer end of the lug L, carried by the pinion K. A bolt N passes loosely through the arm M and lug L, one end projecting sufficiently to accommodate a spiral spring O. The bolt N has a hemispherical head *n*, fitting a corresponding concavity in the arm M, and a hemispherical washer *o*, against which the spring O bears, is fitted to a corresponding cavity of the lug L. The pinion K is toothed only part way round, the portion having no teeth being hollowed out to fit the plain portion of the mutilated gear P. Said gear is provided with teeth upon a little less than half of its circumference, these teeth being adapted to mesh with the teeth of the pinion K. The outlet-passage of the valve is controlled by a valve R, whose construction is similar to that of the valve G just described. A pinion S is mounted upon the valve-stem of the valve R in the same manner as the pinion K upon the valve G. Said pinion S is situated upon the opposite side of the mutilated gear P from the pinion K, so that it is in position to mesh with the teeth of the gear P in alternation with the pinion K. The sheave T, Fig. 1, or an equivalent device is employed to connect the gear P with the control mechanism upon or within the car of the elevator, this mechanism being of any well-known kind, such as the ordinary hand-rope.

The operation of the device is as follows: When the gear P is in the position shown in Fig. 2, in which position its teeth are out of mesh with both of the pinions K and S, and the plain circular portion of its circumference engages with the concaved portion of both pinions, the valves G and R, controlling the inlet and exhaust passages, respectively, are both closed. If now it be desired to open the inlet-valve, the gear P is turned in the proper direction to bring its teeth in position to mesh with the teeth of the pinion K. The elastic pressure exerted by the spring O upon the lug L of the pinion K turns the latter so as to bring its first tooth into the corresponding cavity of the gear P as soon as the latter comes opposite to said tooth. When the pinion K has revolved sufficiently to bring the lug L against the arm M, secured to the valve-spindle, the teeth of the pinion K will have fully engaged with the teeth of the gear P, and the continued movement of the gear P will be transmitted to the pinion K and through the arm M to the valve. During this movement the pinion S will remain at rest, the plain circumference of the gear P sliding in the concavity of said pinion. The reversal of the movement just described sufficient to bring the gear P back to its central position will restore the valve G to its original closed position. The elastic connection between the valve and the pinion K serves the double purpose of giving an elastic pressure for the closure of the valve, thereby insuring the complete closure of the valve notwithstanding original imperfections of adjustment or subsequent wear, and it also serves the further purpose of permitting the gear P and the pinion to engage with certainty and to be well in mesh before the pressure necessary to the opening of the valve is transmitted through it. The operation of the gear P upon the valve R through the pinion S is the same as that just described, except that the gear is turned in the opposite direction. By the employment of separate valves connected in the manner just described I am enabled to use a very simple form of valve which is not liable to get out of order or to leak under the heaviest pressures, while at the same time they are so connected in operation that no waste such as would occur by the opening of both valves at once is permitted. The concavity in the pinion S, within which the plain portion of the gear P works when made to fit said portion of the gear P, serves as a lock for both pinions, preventing their movement except when in mesh with the gear P; but it is not in all cases essential to the operation of my invention.

I claim—

1. The combination of the valve-case, separate valves having threaded stems and controlling the inlet and outlet passages, respectively, and devices connected to both of said valve-stems and adapted to rotate them alternatively, said devices comprising an arm on each of said valve-stems capable of movement around it, a second arm on each of said valve-stems rigidly attached thereto, a spring connecting the pair of arms of each valve-stem, and means for rotating said first-named arms, substantially as described.

2. The combination of a valve-case, separate valves controlling the inlet and outlet passages, respectively, each valve being provided with a pinion by which it is operated, and a mutilated gear adapted to mesh alternatively with said pinions, substantially as described.

3. The combination, in a hydraulic control device, of separate valves controlling the inlet and outlet passages, respectively, each valve having a pinion elastically connected thereto, and a mutilated gear adapted to mesh alternatively with said pinion, substantially as described.

4. The combination of a valve-case, separate valves controlling the inlet and outlet passages, respectively, a pinion loosely mounted on the spindle of each of said valves and having a projecting lug, an arm rigidly secured to each valve-spindle and in position to abut against said lug, an elastic connection tending to maintain contact between said lug and arm, and a mutilated gear adapted to mesh alternatively with said gear, substantially as described.

5. The combination, in a hydraulic control device, of separate valves controlling the inlet and outlet passages, respectively, each valve having a pinion elastically connected thereto, each of said pinions having a concavity on a part of its circumference, a mutilated gear adapted to mesh alternatively with said pinions and having a plain, circular face occupying a part of its circumference, coacting with the concavity of said pinions, substantially as described.

6. The combination, with a valve-case, of separate valves controlling the inlet and outlet passages, respectively, a pinion loosely mounted on a spindle of each of said valves, having a concavity upon a part of its circumference and having a lug projecting from its side, an arm rigidly secured to each valve-spindle in position to abut against said lug upon the pinion, an elastic connection tending to maintain contact between said lug and said arm, and a mutilated gear adapted to mesh alternatively with said pinion and having a portion of its circumference occupied by a plain circular face coacting with the concavity of said pinion, substantially as described.

THADDEUS W. HEERMANS.

Witnesses:
IRWIN VEEDER,
TODD MASON.